United States Patent
Low et al.

[15] 3,678,654
[45] July 25, 1972

[54] PROCESS FOR SEPARATION OF DISSOLVED HYDROGEN FROM WATER BY USE OF PALLADIUM AND PROCESS FOR COATING PALLADIUM WITH PALLADIUM BLACK

[72] Inventors: George M. Low, Deputy Administrator of the National Aeronautics and Space Administration with respect to an invention of; Charles F. Albright, 12512 Kenney Drive, Granada Hills, Calif. 91344

[22] Filed: July 17, 1970

[21] Appl. No.: 55,806

[52] U.S. Cl.....................................................55/16, 55/55
[51] Int. Cl..........................................................B01d 59/10
[58] Field of Search..........................................55/16, 158, 55

[56] References Cited

UNITED STATES PATENTS 3,232,026  2/1966  McKinley....................................55/16
3,350,846  11/1967  Markrides et al.........................55/16

*Primary Examiner*—Charles N. Hart
*Attorney*—Russell E. Schlorff, Marvin F. Matthews and John R. Manning

[57] ABSTRACT

Dissolved gaseous hydrogen in water is separated from the water by placing the water in contact with a thin metallic film of palladium or palladium-silver alloy, both sides of which film have been coated with palladium black. The other side of the film has less pressure than the partial pressure of the hydrogen dissolved in the water. The hydrogen dissolved in the water permeates the film and passes to the other side of it. Preferably the palladium black is applied to the metallic film by etching the film, rubbing palladium chloride powder on the film, reducing the palladium chloride to palladium black by exposing it to gaseous hydrogen, depositing additional palladium black from a palladium chloride solution and rubbing the palladium black coating to remove excess black and provide a tightly bonded adherent coating.

8 Claims, 4 Drawing Figures

Charles F. Albright
INVENTOR.

BY
Russell E. Schlott
ATTORNEY

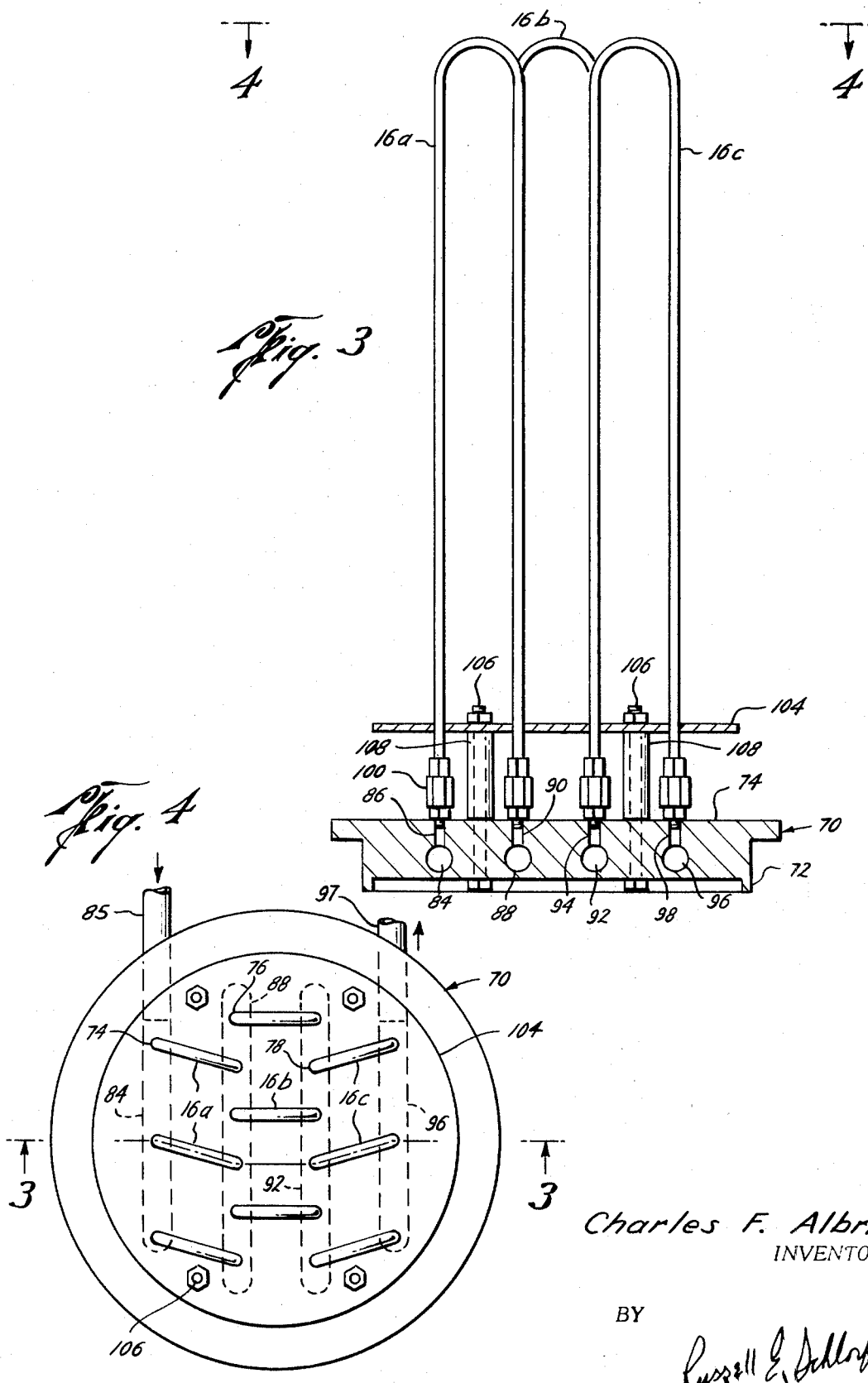

PROCESS FOR SEPARATION OF DISSOLVED HYDROGEN FROM WATER BY USE OF PALLADIUM AND PROCESS FOR COATING PALLADIUM WITH PALLADIUM BLACK

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

BACKGROUND OF THE INVENTION

Applicant does not know of any previous art for the separation of dissolved hydrogen from water by having the hydrogen permeate a palladium film. The closest field of which applicant is aware is the separation of hydrogen from a gaseous stream by having the stream contact a palladium film with the hydrogen component of the stream permeating that film. The other aspect of the present development is in the field of forming a palladium black coating on a palladium film, especially for aiding the permeation of that film by hydrogen.

U.S. Pat. No. 3,232,026 issued Feb. 1, 1966 for Separation Method Using Activated Diffusion Barriers upon the application of David L. McKinley teaches the separation of a hydrogen component from a gaseous mixture by placing that mixture in contact with a thin metallic palladium film which has been coated on each side with palladium black. Palladium is permeated by hydrogen and the coating of both sides of the palladium film with palladium black greatly enhances the rate of permeation and hence separation of hydrogen from the gaseous mixture, especially at temperatures in excess of 200° C. U.S. Pat. No. 3,232,026 also refers to certain techniques for applying palladium black.

Neither U.S. Pat. No. 3,232,026 nor any other prior art of which applicant has knowledge, teaches the separation of dissolved hydrogen from water by the use of a palladium film coated on each side with palladium black nor the process for coating palladium with palladium black that is described and claimed herein.

SUMMARY OF THE INVENTION

The Apollo spacecraft carry fuel cells which produce water saturated with hydrogen at operating conditions—usually about 60 p.s.i.a. and 160 F. This fuel cell water constitutes a potable water supply for the astronauts and has other uses. The dissolved hydrogen in this water causes problems, especially at zero gravity and low pressures. Reduction of the hydrostatic pressure on the effluent water from the fuel cell causes the dissolved hydrogen to revert to the gaseous phase which can occupy a considerable volume, depending upon the final pressure. Accumulation of hydrogen during a mission can seriously reduce the storage capacity of the potable water tank. If concentrated in localized areas, the hydrogen constitutes a potential fire and explosion hazard. In addition, a hydrogen water emulsion is a source of irritation to the astronauts during drinking or reconstitution of freeze-dried foods.

It is therefore a general purpose of the present invention to provide a process for the removal of dissolved hydrogen from water, especially at ambient temperatures.

In separating the dissolved hydrogen, use is made of thin palladium or palladium-silver alloy film, coated on each side with palladium black. Preferably for structural strength, the film is in the form of a tube. Previous methods known to Applicant for applying palladium black to palladium film are not satisfactory for coating the interior of relatively small tubes, such as ⅛th inch O.D. tubing or are too time consuming.

It is therefore another object of the present invention to provide a process for applying a coating or layer of palladium black to a palladium or palladium-silver alloy film especially for use in accelerating the permeation of the film by hydrogen.

In the prior art, there is a process, hereinafter usually called the "wet process," for applying palladium black to a film of palladium or palladium-silver alloy in which a film is exposed to hydrogen so that the palladium absorbs hydrogen. A solution is made of palladium chloride in hydrochloric acid, the acid being used because of the difficulty of dissolving palladium chloride. The hydrogen-containing film is brought in contact with the palladium chloride solution so that the hydrogen in the palladium film reduces the palladium chloride to palladium black.

One of the difficulties with the wet process is that it takes a considerable period of time, usually several days, for the uncoated film to absorb the maximum amount of hydrogen that it can hold. This hydrogen is necessary for the reduction of the palladium chloride.

It is therefore another object of the present invention to provide a method of increasing the rate at which a palladium or palladium alloy film will absorb hydrogen prior to depositing a layer of palladium black by the wet process.

Other and further objects, features and advantages will be apparent from the following description and presently preferred examples of the present invention, given for the purpose Of disclosure and taken in conjunction with the accompanying drawings.

The process for separation of the dissolved gaseous hydrogen from water is based on the discovery that if a metallic film made from palladium or a palladium-silver alloy is coated on each side with palladium black, one side of the film is provided with less pressure than the partial pressure of the hydrogen in the water, and the other side of the film is contacted with the water containing the dissolved hydrogen, that the dissolved hydrogen will leave the water and pass through the film even at ambient temperatures. Any of the palladium-silver alloys commonly used for separation of gaseous hydrogen from a mixed gas stream may be used such as 75 percent palladium and 25 percent silver. PreferAbly the film is a tube having an approximate one-eighth inch outside diameter.

With respect to the coating of palladium black, the present invention is based upon the discovery that an excellent coating can be applied to palladium or palladium-silver alloy film by etching the film, rubbing palladium chloride powder on the etched film, and reducing the palladium chloride to a palladium black coating by exposing the palladium chloride on the metallic film to gaseous hydrogen. If a second coating is not to be applied by the wet process, the coating formed from the powder is preferably burnished or rubbed after formation as this appears to make a better contact of the coating with the film and thereby increases the rate of permeation of hydrogen.

While the palladium black coating formed from the palladium chloride powder may be used alone, a better product may be obtained by exposing the film coated with the initial coating of palladium black to the wet process to deposit an additional palladium black coating by the reduction of the palladium chloride in the solution with the use of the hydrogen contained in the film coated with the initial palladium black coating. After carrying out the wet process, the final coating is burnished or rubbed. The entire time occupied in forming the initial coat of palladium black is much less than the time necessary for untreated film to become saturated with hydrogen.

Information available to applicant indicates that palladium black applied by the process of the present invention is superior in aiding permeation by hydrogen to palladium black applied by any other method known to applicant.

BRIEF DESCRIPTION OF THE DRAWINGS

FIG. 3 is a view along the line 3—3 of FIG. 4.

FIG. 4 is a plan view illustrating one form of apparatus which may be used for separation of dissolved hydrogen from water.

DESCRIPTION OF THE PREFERRED EMBODIMENTS

Figure 1:
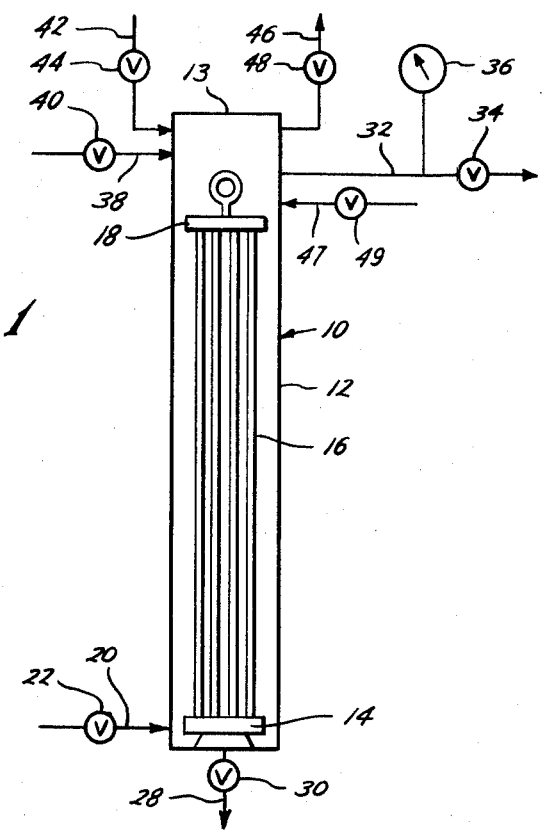
FIG. 1 is a partly schematic illustration of processing retort useful in applying palladium black in accordance with the present invention.

Referring to the drawings, there is illustrated in FIG. 1 a glass processing retort for use in etching palladium tubes and reducing the palladium chloride to palladium. The retort, indicated generally by the numeral 10 has a glass cylindrical body 12 with a removable top 13. The body 12 contains a removable tube rack 14 upon which palladium tubes 16 are placed and held in spaced relationship at their lower ends. A perforated separator plate 18 near the upper end of the body 12 holds the upper ends of the tubes 16 in spaced relationship. Near the lower end of the retort 10 and communicating with the interior of the body 12 are a line 20 with a valve 22 for admitting air to the interior of the bOdy 12 and a line 28 with a valve 30 which serves as a drain from the body 12.

Near the upper end of the body 12 are a line 38 with a valve 40 therein for admitting nitrogen to the interior of the body 12, a line 42 with a valve 44 for introduction of liquid into the body 12, a line 46 with a pressure relief valve 48, a line 32 with a valve 34 for connection to a vacuum source, and a line 47 with a valve 49 for introducing hydrogen into the body 12. A pressure gauge 36 in the line 32 indicates the pressure within the body 12.

Figure 2:
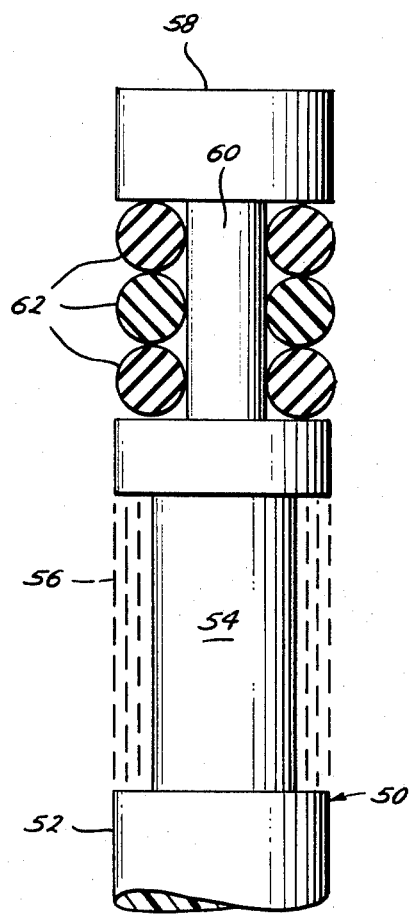
FIG. 2 is an enlarged view, partly sectional, of a form of device useful for applying palladium chloride powder to the interior of palladium tubes.

In FIG. 2 is illustrated a tool or device indicated generally by the numeral 50 used for applying palladium chloride to the interior of the tubes 16. This tool 50 is made from a nylon rod 52 of which only one end is shown in FIG. 2. The rod has a first reduced diameter portion 54 around which is placed a lint-free tissue paper 56. Between the first reduced diameter portion 54 and the end 58 of the rod 52 is a second reduced diameter portion 60 containing three O-rings 62 made of neoprene. The diameters of the nylon rod 52, of the tissue paper 56 and of the O-rings 62 are such that these parts all fit the inside diameter of the palladium tubes 16.

An example of a preferred method of coating palladium or palladium-silver alloy with palladium black is as follows. 20-inch tubes are cut from palladium-silver alloy tubes having 25 percent silver. Each tube is ⅛th inch O.D. and has a wall thickness of 10 mil. To clean the tubes, each is immersed in acetone, the acetone is drained, and the tubes are immersed in isopropyl alcohol with the inside diameter being flushed under slight pressure. All handling hereafter is with polyethylene gloves.

The tubes are removed from the alcohol, drained, and blown dry. They are immersed in a detergent and scrubbed. The interior is scrubbed with the device of FIG. 2. The detergent is flushed and the tubes thoroughly rinsed in distilled water. The tubes are then inserted in a retort similar to that of FIG. 1.

Reagent-grade concentrated nitric acid is inserted into the retort 10 until the upper ends of the tubes 16 are covered. The tubes are moved up and down frequently during a 15 minute period to ensure fresh acid contacts the tube interior and complete surface etching is obtained. The acid is drained from the retort and the retort is filled again with concentrated nitric acid with frequent agitation for about 15 minutes. The second batch of acid is drained off and the interior of the tubes and retort 10 are rinsed with distilled water. The interior of the retort 10 is then swept with nitrogen to remove liquid with final drying being under vacuum. Any remaining acid on the ends of the tubes where they are held by the rack is removed with water and cotton swabs and the ends are then dipped in isopropyl alcohol and redried.

To apply the palladium chloride, one end of each tube 16 is dipped into palladium chloride powder for about one-eighth to three-eighths inches. The tool of FIG. 2 is then inserted into the tube and moved back and forth to distribute the palladium chloride over the entire internal diameter of the tube. This is repeated using the other end of the tube. This operation is repeated for a minimum of six times and then the excess palladium chloride is blown from the interior of the tube. The palladium chloride powder is applied to the outside of the tubes by rubbing with a gloved thumb and forefinger. Here also, excess powder is removed by blowing with nitrogen.

The tubes are then returned to the processing retort 10, a vacuum is pulled on the retort and then hydrogen is introduced into the retort until slightly above atmospheric pressure. After the hydrogen pressure stabilizes, the hydrogen atmosphere is maintained a minimum of 2 hours and then it is swept out by nitrogen.

At this point, the palladium chloride is reduced to palladium black initial coating. To add another coat, a 0.3 percent solution of palladium chloride is hydrochloric acid is introduced into the interior of the retort 10 and the tubes moved up and down in this solution with the solution being drained and changed at 5 minute intervals. This soak in palladium chloride is maintained for about 30 minutes. The absorbed hydrogen within the palladium causes additional palladium black to be deposited onto the initial coating. The palladium chloride solution is drained and the tubes washed with distilled water. Thereafter, the tubes are dried using nitrogen and vacuum.

After the tubes are dry, air is introduced slowly into the retort 10. The air will react with hydrogen in the tubes 16 and cause them to heat. The internal temperature of the retort should not be allowed to exceed 150° F. The tubes 16 can be cooled if necessary by evacuating the air and flowing nitrogen into the retort 10.

After the adsorbed hydrogen has been completely removed by the air oxidation step, the tubes are removed from the retort 10 and their outside surfaces burnished with lint-free tissue. The inside is burnished with a device identical to that of FIG. 2 except that it does not have the O-rings 60. It has also been found that ordinary pipe cleaner material is satisfactory for the burnishing step.

Referring now to FIGS. 3 and 4, there is shown a hydrogen separator indicated generally by the numeral 70 which may be used in the present process of separating dissolved hydrogen from water. The hydrogen separator 70 has a generally cylindrical base 72 open at its lower end and having a plate 74 at its upper end. Drilled through the plate 74 are four rows 76, 78, 80 and 82, respectively, of holes for receiving a series of tubes 16a, 16b and 16c made of palladium-silver alloy coated with palladium black. Row 76 has three holes, row 78 has six holes, row 80 has six holes and row 82 has three holes. Bored in the plate 74 under row 76 is an inlet manifold 84 communicating with a line 85 connected to a source of water. This manifold 84 has an upstanding short section of tubing 86 extending through each of the holes in the row 76. Bored in the plate 74 under the row 78 is a manifold 88 which has an upstanding short section of tubing 90 extending through each of the holes in row 78. Bored in the plate 14 under the row 80 is a manifold 92 which has communicating with it a short upstanding section of tubing 94 extending upwardly through each of the holes in the row 80. Bored in the plate 74 under the row 82 is an outlet manifold 96 connected to an exhaust line 97. This outlet manifold 96 has communicating with it a short section of upstanding tubing 98 extending upwardly through each of the holes in the row 96.

At each of the holes in the row 76, one end of a U-shaped palladium-silver alloy tube 16a coated on the inside nd outside and palladium black is attached by a threaded sleeve 100 to the short section of tubing 86 projecting upwardly from the manifold 84. The other end of each tube 16a is secured by a sleeve 102 to an upstanding piece of tubing 90 extending from one of the holes in the row 80. Similarly, three tubes 16b, identical to the tubes 16a, are connected between the sections of tubing 90 in the other three holes in row 78 and the sections of tubing 94 in three of the holes in row 80. Again, three tubes 16c identical to tubes 16a are connected between the sections of tubing 94 in the other three holes of row 80 and the sections of tubing 98 in the row 82.

These tubes 16a, 16b and 16c are additionally secured in position by a perforated teflon retainer plate 104 held in place by spacing bolts 106 passing through sleeves 108, the teflon retainer plate 108 and the plate 74.

Water containing dissolved hydrogen is introduced into the inlet manifold 84 and passes through the tubes 16a to the manifold 88. Water entering the manifold 88 flows through the tubes 16b to the manifold 92. Water entering the manifold 92 flows through the tubes 16c into and out of the outlet manifold 96.

In operation of the device of FIGS. 3 and 4, the dissolved hydrogen contained within the water passing through the tubes permeates the walls of those tubes. If desired, a bell jar may be placed over the tubes 16a, 16b and 16c to rest upon the plate 74 and be evacuated to simulate outer space.

An example of a preferred method of removing dissolved hydrogen from water is as follows. In a device such as is illustrated in FIGS. 3 and 4 were placed tubes one-eighth inch in diameter, 10 mil thick and made of palladium-silver alloy containing 25 percent silver coated with palladium black having a loading of 2 mg/cm$_2$. Nine tubes, each 20 inches in length, were arranged within the separator 70. Water at 75° F. with a flow of 10 cubic centimeters per minute and containing dissolved hydrogen having a partial pressure of 60 p.s.i.a. was passed through the inlet manifold. The exteriors of the tubes were exposed to air which removed hydrogen from the palladium alloy tubes by oxidation. The partial pressure of the dissolved hydrogen dropped to 3.5 p.s.i.a. Operation of such a unit for over 5 months (3,700 hours) indicated no loss of efficiency in removal of hydrogen.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. A process for the separation of dissolved hydrogen from water comprising:
    a. providing a metallic film selected from the group consisting of palladium and palladium-silver alloy, both sides of said film being coated with palladium black,
    b. providing on one side of the film less hydrogen pressure than the partial pressure of the hydrogen in the water,
    c. contacting the other side of the film with the water containing dissolved hydrogen at ambient temperature, and
    d. passing the dissolved hydrogen through the film.

2. The method of claim 1 in which the film is tubular in shape.

3. The method of claim 1 in which the film is a tube having an approximate one-eighth inch outside diameter.

4. A process for separating dissolved hydrogen from water, said process comprising:
    a. providing a metallic film selected from the group consisting of palladium and palladium-silver alloy, both sides of said film being coated with palladium black formed by a process which includes (i) etching the metallic film, (ii) rubbing palladium chloride powder on the etched film and (iii) reducing the palladium chloride to palladium black by exposing the palladium chloride powder on the metallic film to gaseous hydrogen,
    b. providing on one side of the film less hydrogen pressure than the partial pressure of the hydrogen in the water,
    c. contacting said other side of the film with the water, containing dissolved hydrogen, and
    d. passing the dissolved hydrogen through the film.

5. The process of claim 4 in which the metallic film is tubular in shape.

6. A process for separating dissolved hydrogen from water, said process comprising:
    a. providing a metallic film selected from the group consisting of palladium and palladium-silver alloy, both sides of said film being coated with palladium black formed by a process which includes (i) etching the metallic film, (ii) rubbing palladium chloride powder on the etched film, (iii) reducing the palladium chloride to a palladium black initial coating by exposing the palladium chloride powder on the metallic film to gaseous hydrogen and (iv) depositing an additional coating of palladium black by exposing the initial coating to a solution of palladium chloride whereby hydrogen in the film reduces palladium chloride in the solution to palladium black,
    b. providing on one side of the film less hydrogen pressure than the partial pressure of the hydrogen in the water, and
    c. contacting said other side of the film with the water containing dissolved hydrogen, and
    d. passing the dissolved hydrogen through the film.

7. The process of claim 6 in which the palladium chloride solution includes hydrochloric acid as a solvent.

8. The process of claim 6 in which the metallic film is tubular in shape.

* * * * *